E. E. JACKSON.
WEED EXTERMINATOR.
APPLICATION FILED JUNE 26, 1908.
919,017.
Patented Apr. 20, 1909.
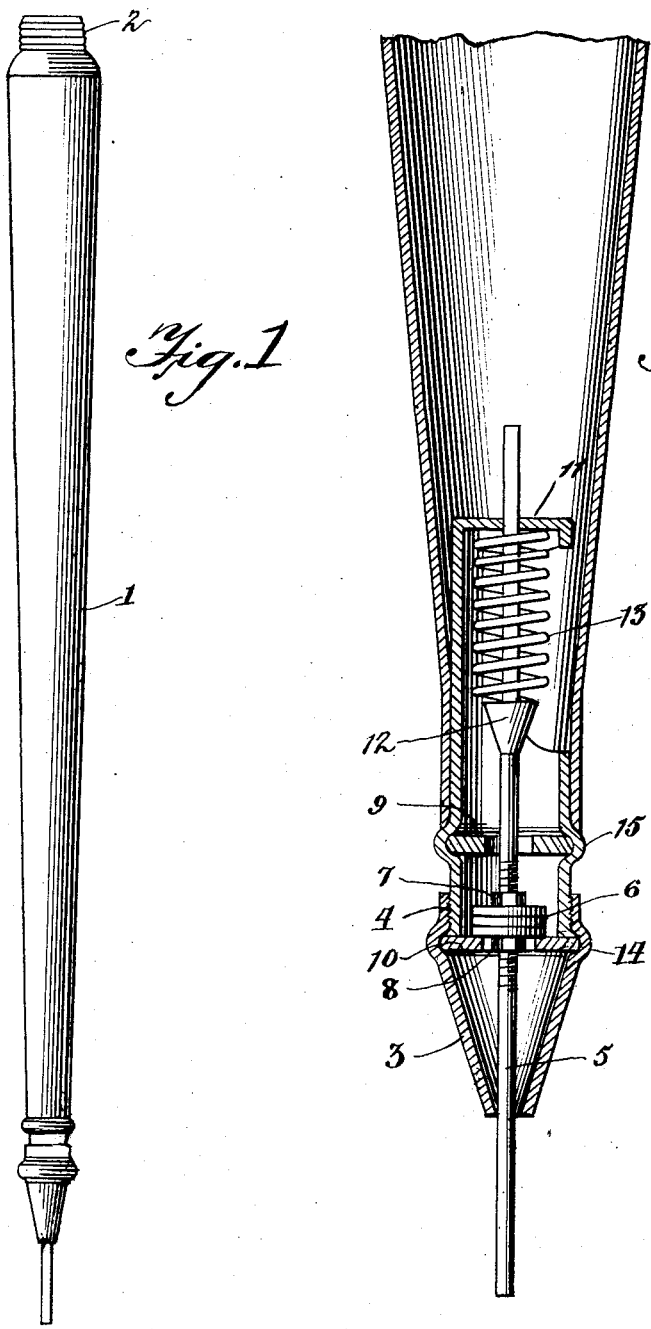

UNITED STATES PATENT OFFICE.

EDWIN E. JACKSON, OF NEWTON, KANSAS.

WEED-EXTERMINATOR.

No. 919,017.　　　Specification of Letters Patent.　　　Patented April 20, 1909.

Application filed June 26, 1908. Serial No. 440,558.

*To all whom it may concern:*

Be it known that I, EDWIN E. JACKSON, a citizen of the United States, residing at Newton, in the county of Harvey and State of Kansas, have invented new and useful Improvements in Weed-Exterminators, of which the following is a specification.

This invention relates to weed exterminators, the object of the invention being to provide a hand implement embodying a reservoir and means operable by contact with the ground for forming a hole in the ground and admitting a predetermined quantity of liquid of such nature as to destroy or poison the roots of the weeds causing the same to die.

With the above and other objects in view, the nature of which will more fully appear as the description proceeds, the invention consists in the novel construction, combination and arrangement of parts as herein fully described, illustrated and claimed.

In the accompanying drawings:—Figure 1 is a side elevation of a weed exterminator embodying the present invention. Fig. 2 is a vertical sectional view through the lower portion thereof taken on an enlarged scale.

The device comprises essentially a reservoir 1, which is preferably in the form of a long tapering tube, the same being provided at its upper larger end with a reduced portion or neck upon which is fitted a threaded filling cap or closure 2 by means of which any suitable exterminating liquid, such as gasolene, kerosene and the like may be introduced into the body of the reservoir.

Secured to the lower end of the reservoir is an inverted conical end piece or nozzle 3 which is preferably mounted detachably on the main body of the reservoir by a screw threaded connection as shown at 4 in order to give ready access to the valve arrangement on the interior thereof.

Extending longitudinally within the lower portion of the device is a stem 5 of a valve 6, the latter consisting of any desired number of disks as shown in Fig. 2. These disks may be of any suitable material and are held in place at the desired point on the stem 5 by means of clamping nuts 7 and 8, arranged respectively above and beneath the disks 6 and threaded upon the stem 5. Within the body of the implement, there is also arranged an upper valve seat 9 while at a lower point there is a second or lower valve seat 10, the valve 6 playing upward and downward between the valve seat 9 and the other valve seat 10, while the space between said valve seats forms a measuring chamber for the liquid, passing downward by gravity from the cone body of the reservoir 1. The stem at or near its upper end passes through a guide 11 suitably arranged within the lower end of the reservoir 1 while between said guide 11 and an enlarged shoulder or seat 12 on the stem there is introduced a valve spring 13 the tension of which is exerted to thrust and hold the valve 6 in contact with the lower valve seat as shown in Fig. 2.

The nozzle section 3 may be swaged outward as shown at 14 to form an annular groove for the retention of the lower valve seat 10 while the reservoir may be swaged outward as shown at 15 to form a corresponding groove for the retention of the upper valve seat 9.

In the operation, the lower end of the point of the stem is thrust into the ground forming a hole in the ground and causing the stem 5 to press the valve 6 upward against the upper valve seat. This allows liquid contained between the valve seats 9 and 10 to pass downward through the nozzle and fill the hole formed by the stem 5 when the latter is withdrawn. By forming the hole adjacent to the roots of the weed, the liquid is thus deposited in close proximity thereto and acts in short order to kill the weed. Upon lifting the implement from the ground, the spring 13 returns the valve quickly to the lower seat and allows the measuring chamber to again fill. The amount of liquid may be varied by increasing or diminishing the number of disks 6 which constitute the valve.

I claim:—

A weed exterminator comprising a reservoir provided with a discharge nozzle, spaced valve seats controlling the discharge, a longitudinally movable valve stem having a portion projecting outside and beyond the nozzle, and a valve carried by said stem and movable between the valve seats, said valve consisting of a plurality of sections, and means for clamping the sections together on the stem.

In testimony whereof I affix my signature in presence of two witnesses.

EDWIN E. JACKSON.

Witnesses:
 B. H. TURNER,
 C. G. SIEGLINGER.